(12) United States Patent
Mori (10) Patent No.: US 7,680,570 B2
(45) Date of Patent: Mar. 16, 2010

(54) PARKING ASSIST DEVICES, METHODS, AND PROGRAMS

(75) Inventor: Toshihiro Mori, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 675 days.

(21) Appl. No.: 11/482,156

(22) Filed: Jul. 7, 2006

(65) Prior Publication Data
US 2007/0021881 A1   Jan. 25, 2007

(30) Foreign Application Priority Data
Jul. 25, 2005   (JP) .............................. 2005-214835

(51) Int. Cl.
*G01C 11/00* (2006.01)
*G01C 22/00* (2006.01)
*G05D 1/02* (2006.01)
(52) U.S. Cl. ....................................................... 701/28
(58) Field of Classification Search ........................ None
See application file for complete search history.

(56) References Cited

U.S. PATENT DOCUMENTS 6,411,867 B1 * 6/2002 Sakiyama et al. .............. 701/1

7,366,595 B1 * 4/2008 Shimizu et al. ............. 701/301
2003/0108222 A1 * 6/2003 Sato et al. .................... 382/104

FOREIGN PATENT DOCUMENTS

JP   A 2003-244688   8/2003

* cited by examiner

*Primary Examiner*—Eric Bolda
*Assistant Examiner*—Ari M Diacou
(74) *Attorney, Agent, or Firm*—Oliff & Berridge, PLC (57) ABSTRACT

Parking assist devices, methods, and programs determine a current position of a vehicle and acquire image data from a camera provided on the vehicle. The devices, methods, and programs extract a predetermined region of the acquired image data, the predetermined region being a portion of the image that will be in a blind spot of the camera if the vehicle travels a first predetermined distance from the current position. The devices, methods, and programs correlate the extracted image data with the current position of the vehicle and cause the correlated extracted image data to be stored in a memory. The devices, methods, and programs read out past correlated extracted image data, the past correlated extracted image data having been acquired when the vehicle was in a previous position, the previous position being a second predetermined distance from the current position. The devices, methods, and programs output a parking assist image to a display, the parking assist image displaying both the past correlated extracted image data, and the image data acquired at the current position of the vehicle.

20 Claims, 9 Drawing Sheets

PARKING ASSIST DEVICES, METHODS, AND PROGRAMS

INCORPORATION BY REFERENCE

The disclosure of Japanese Patent Application No. 2005-214835 filed on Jul. 25, 2005, including the specification, drawings and abstract thereof, is incorporated herein by reference in its entirety.

BACKGROUND

1. Related Technical Fields

Related technical fields include parking assist devices, methods, and programs.

2. Description of the Related Art

Conventional parking assist devices provide assistance to a driver of a vehicle while parking. These devices acquire image data from rear-mounted onboard camera. The image data generated by the camera is output into a display disposed near the driver seat. This onboard camera normally is for capturing an image of the background in the center portion of the vehicle rear bumper and the rear side of the vehicle.

Japanese Unexamined Patent Application Publication No. 2003-244688 discloses a parking assist device that accumulates the image data acquired from a rear-mounted onboard camera in a memory. As a result, an image is displayed which synthesizes the background of the vehicle in an area below the floor of the vehicle and areas near the rear corners (blind spot regions) using the accumulated image data. According to this device, when the vehicle starts to move in reverse, image data is read out from the memory that represents areas in blind spot regions and used to synthesize a view of the blind spot regions from the driver seat. Thus, a viewpoint is set to the position of the driver seat, and an image is displayed on the display screen including the blind regions such as the rear body of the vehicle when the rear side is viewed from the driver seat.

SUMMARY

According to conventional parking assist devices, for example, the blind spot regions are beyond the viewing area of the onboard camera. Accordingly, the screen outputting the image cannot display images of the blind spot regions. Therefore, movement of the rear corner area relative to a parking area or an obstacle is difficult to be confirmed while parking.

With the device of Japanese Unexamined Patent Application Publication No. 2003-244688, although a view of blind spot areas may be synthesized, the various image data image-captured at the various location points according to movement of the vehicle must be accumulated in a storage unit. Also, when the synthesized image is output, the necessary image data from the accumulated various image data must be read at a particular timing that updates the image according to the vehicle movement. Thus, if the frequency of updating of the synthesized image is increased to provide a smooth moment of the images, a CPU with high processing functionality and expensive hardware such as large memory capacity and hard disks are required.

Thus, it may be beneficial to provide an increasing frequency of updating the screen with an inexpensive hardware configuration, for example, by reducing the data to be stored and/or reducing a processing load.

Various exemplary implementations of the broad principles described herein provide parking assist devices, methods, and programs that may determine a current position of a vehicle and may acquire image data from a camera provided on the vehicle. The devices, methods, and programs may extract a predetermined region of the acquired image data, the predetermined region being a portion of the image that will be in a blind spot of the camera if the vehicle travels a first predetermined distance from the current position. The devices, methods, and programs may correlate the extracted image data with the current position of the vehicle and may cause the correlated extracted image data to be stored in a memory. The devices, methods, and programs may read out past correlated extracted image data, the past correlated extracted image data having been acquired when the vehicle was in a previous position, the previous position being a second predetermined distance from the current position. The devices, methods, and programs may output a parking assist image to a display, the parking assist image displaying both the past correlated extracted image data, and the image data acquired at the current position of the vehicle.

BRIEF DESCRIPTION OF THE DRAWINGS

Exemplary implementations will now be described with reference to the accompanying drawings, wherein.

DETAILED DESCRIPTION OF EMBODIMENTS

Examples of parking assist devices, methods, and programs will be described below in the context of a navigation device, which is mounted on a vehicle. However, it should be appreciated that the exemplary parking assist devices, methods, and programs may be provided separately, for example as a stand-alone device.

Figure 1:
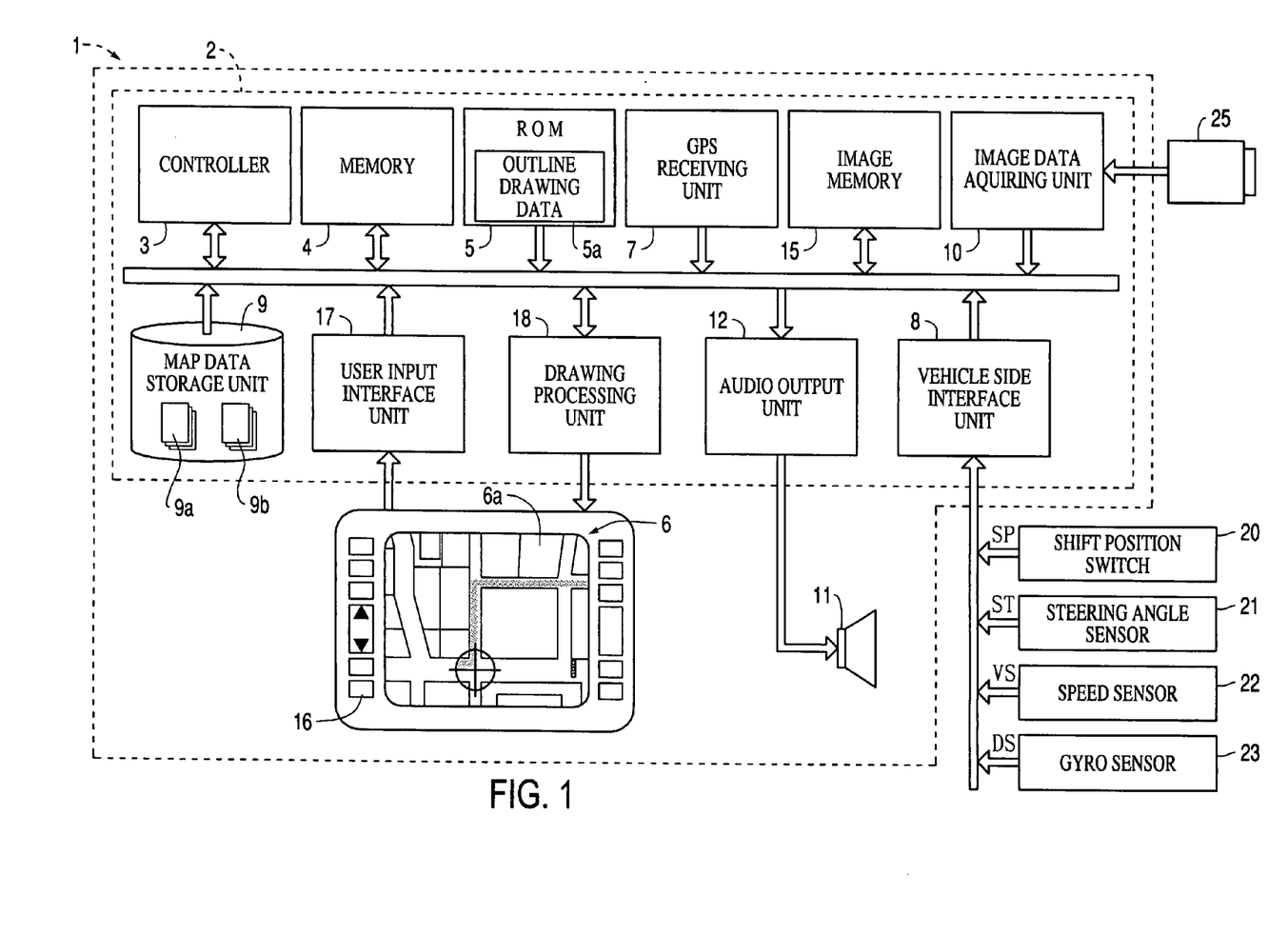
FIG. 1 is a block diagram showing an exemplary a navigation device.

FIG. 1 is a block diagram showing an exemplary configuration of a navigation device 1. As shown in FIG. 1, the navigation device 1 may include a control portion 2. The control portion 2 may include for example a general controller 3, a memory 4, and ROM 5 serving as position specifying means and readout means for performing main control. The controller 3 may be, for example, a CPU, that may implement or control various processes according to, for example, various types of programs. Such programs may include route guidance programs and/or parking assist programs, stored in the ROM 5. The memory 4 may be, for example, a RAM for temporarily storing programs, data, and various variables for the purpose of parking assistance.

Figure 8:
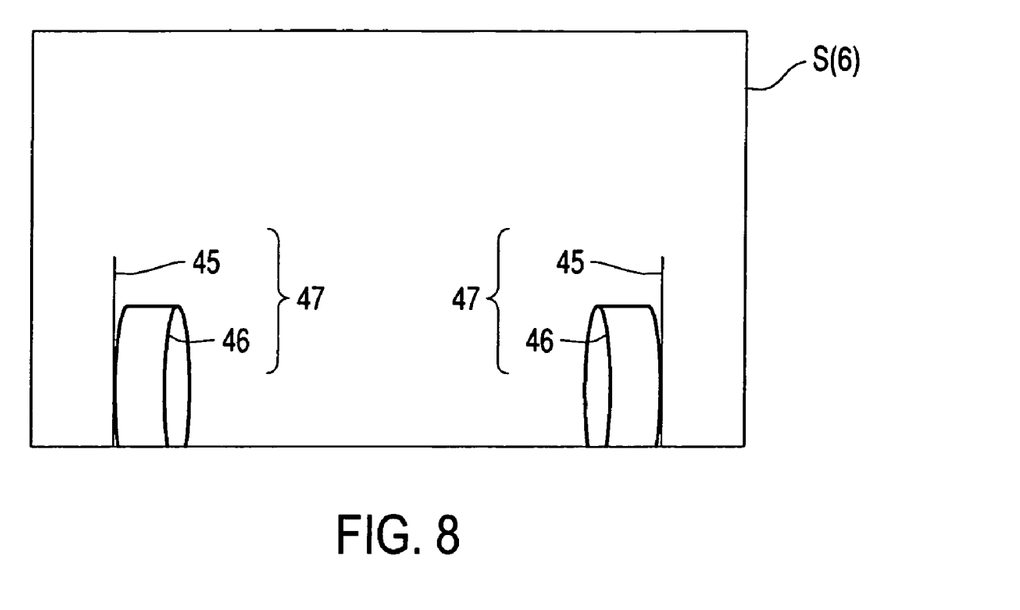
FIG. 8 is a diagram showing a projection line.

The ROM 5*a* may store outline drawing data 5*a*. The outline drawing data 5*a* may be, for example, data for drawing the outline of the vehicle C shown in FIG. 2, in which the navigation device 1 is installed. When, for example, the outline drawing data 5a is output on the display 6, a projection line 47 serving as an indicator may be drawn, such as that shown in FIG. 8. The projection line 47 may have an exterior outline drawing line 45, showing the exterior outline of the vehicle body, and/or a rear wheel drawing line 46, showing each rear wheel CR (see FIG. 2).

Also, as shown in FIG. 1, the control portion 2 may include a GPS receiving unit 7. The GPS receiving unit 7 may receive radio waves from a GPS satellite. Based on a position detecting signal output from the GPS receiving unit 7, the controller 3 may periodically calculate the absolute position of the vehicle C in terms of latitude, longitude, and/or altitude.

The control portion 2 may include a vehicle side interface unit 8. The controller 3 may input vehicle data as, for example, a shift position signal SP, a steering angle sensor signal ST, a speed signal VS, and/or a directional detection signal DS, via the vehicle side interface unit 8.

The shift position signal SP may be a signal output from the shift position switch 20 and may indicate the current shift position. The steering angle sensor signal ST may be a signal that is output from the steering angle sensor 21 and may indicate the current steering angle of the vehicle C. The speed signal VS may be a pulse signal which is output from a speed sensor 22 (e.g., that detects a rotational speed of the wheels). The controller 3 may calculate the speed of the vehicle C based on this pulse signal and may also calculates shifting distance of the vehicle C based on, for example, the input number of pulses. The directional detection signal DS may show the direction of the vehicle C and may be output from a gyro sensor 23 provided on the vehicle C.

The controller 3 may generates navigation data based on, for example, the speed signal VS and directional detection signal DS, and may corrects the vehicle position which is calculated based on the GPS receiving unit 7 based on the speed signal VS and directional detection signal DS.

The control portion 2 may include a map data storage unit 9. The map data storage unit 9 may store, for example, route data 9a and a map drawing data 9b. The route data 9a may include node data and link data and the controller 3 may use the routing data 9a to perform route searches and route guidance, for example, according to the routing assistance program stored in the ROM 5.

As used herein, the term "link" refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes. As used herein the term "node" refers to a point connecting two links. A node may be, for example, an intersection, an intersection having more than three roads, a curve, and/or a point at which the road type changes.

The controller 3 may match the vehicle position calculated as described above with the route data 9a and determine the position of the vehicle position on an appropriate roadway, thereby improving the precision of the vehicle position. The map drawing data 9b may be data for showing a map screen 6a on the display 6. Thus, a map may be drawn on the display 6 and is correlated to the routing data 9a.

The display 6 may be a touch panel. When the vehicle C advances, the map screen 6a may be displayed and when the vehicle C backs up, the parking assist mode may be switched on by the controller 3. The parking assist mode may have a first and second display mode set therein. According to the first display mode, the rear of the vehicle C may be displayed on a back-up monitor screen including images captured by a back-up monitoring camera 25. According to the second display mode, for example, a parking assist screen 41 (see FIG. 12) that uses image data captured at different locations may be displayed.

The navigation device 1 may include a speaker 11. The speaker 11 may output an assistance sound and/or assistance audio for assisting with route guidance, based on an output signal from the audio output unit 12 of the control portion 2.

The control portion 2 may include an image data acquiring unit 10 that controls the camera 25 provided on the vehicle C and, under control of the controller 3, acquires image data G (see FIG. 3) at various locations as the vehicle C backs up. For example, each time the vehicle C shifts a predetermined image acquiring distance D1 on a vehicle coordinate system (X, Y) shown in FIG. 2, the image data G may be acquired again. According to this example, the image acquiring distance D1 is set to about 200 mm.

Figure 2:
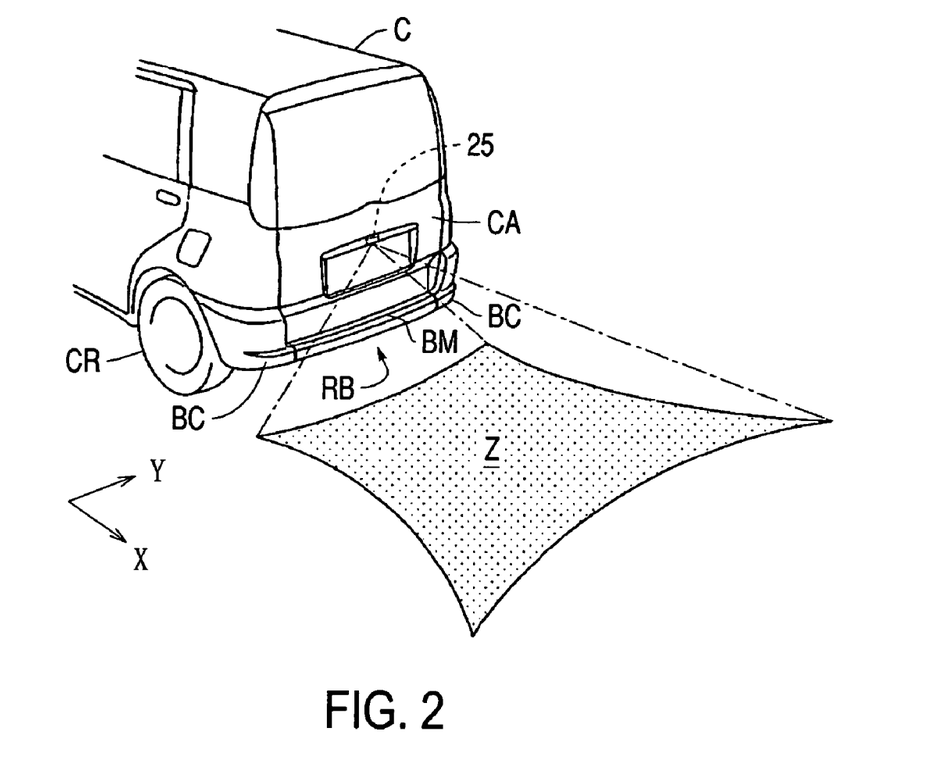
FIG. 2 is a diagram showing an exemplary position of a camera.
Figure 3:
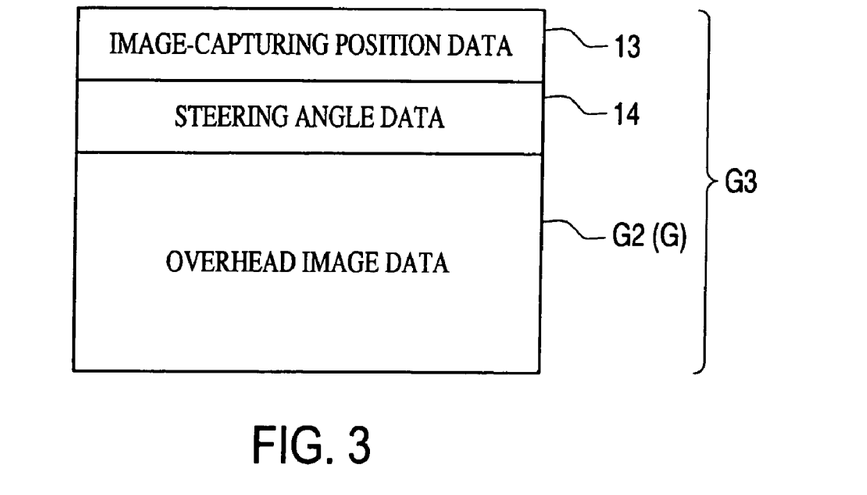
FIG. 3 shows an exemplary data structure stored in an image memory.

As shown in FIG. 2, the camera 25 may be affixed with the optical axis facing downwards, in approximately the center position in the direction of the vehicle width (Y-axis direction in the vehicle coordinate system) on the vehicle C. The camera 25 may be a digital camera that may captures images in color and may generates image data G that has undergone analog/digital conversion. The camera 25 may have, for example, an optical mechanism including a wide-angle lens and/or mirrors and a CCD image-capturing element. The camera 25 may have a rear field of view of, for example, about 140 degrees from left to right. The camera 25 may have several meters of rear-facing roadway as the visible range Z. In the image-capturing range of the camera 25, the central portion BM may be included, which excludes the bumper corners (hereafter called corner portions BC) of the rear bumper RB.

Figure 5:
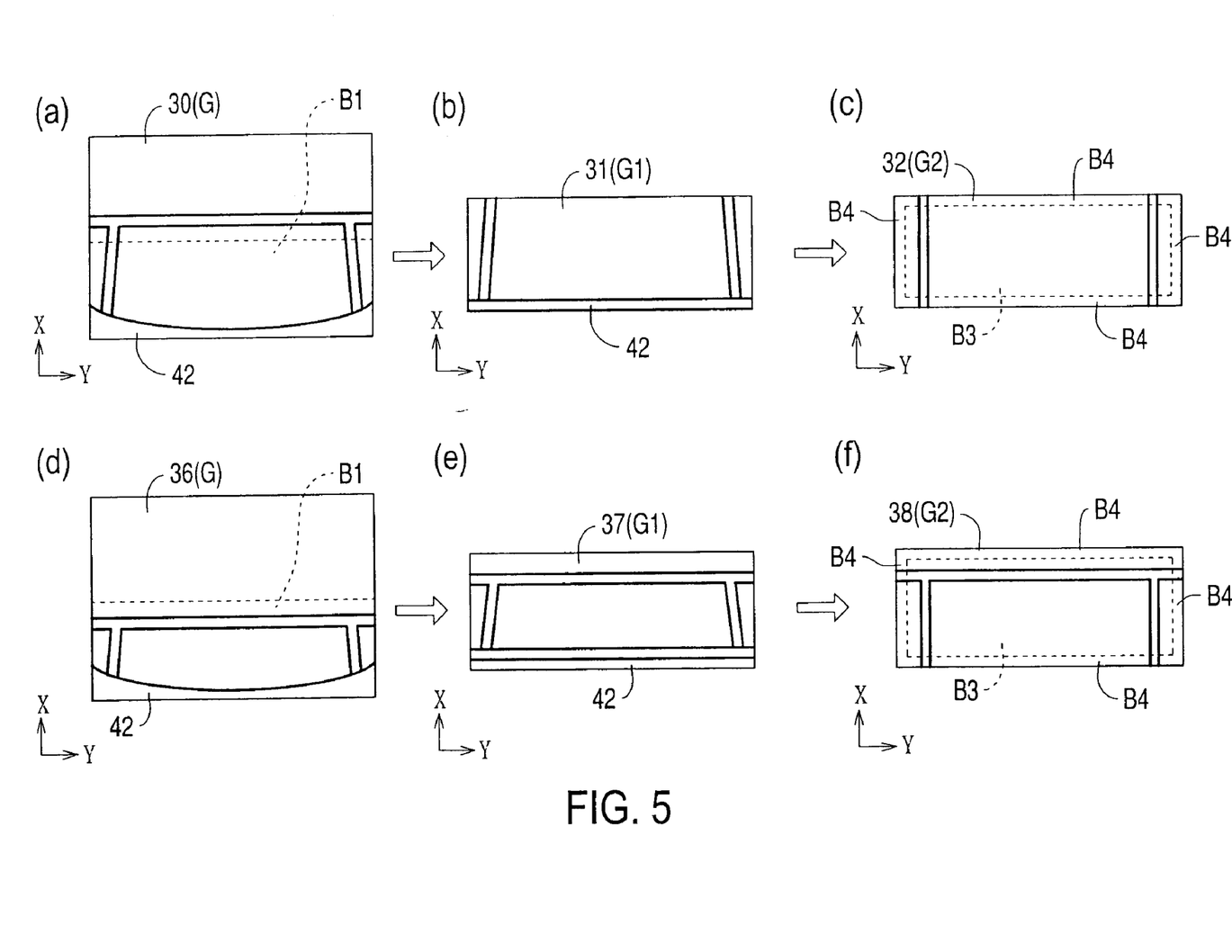
FIG. 5 shows an exemplary method of generating overhead image data.

The image data G generated by the camera 25 may be displayed in an image 30 such as that, for example, shown on screen (a) in FIG. 5. A rear edge image 42, which is the central portion BM of the rear bumper RB, may be displayed on the bottom edge of the image 30. The image 30 may produce distortion aberration wherein the periphery of the image is distorted due to the use of a wide-angle lens, but the distortion may be of a level that the driver can intuitively understand what is being shown in the image. Further, the image 30 may be displayed with the left and right being reversed, so as to orient the image with images reflected in the rearview mirror of the vehicle.

Also, as shown in FIG. 1, the control portion 2 may have a user input interface unit 17. The user input interface unit 17 may output input signals to the controller 3, according to input operations of a user on, for example, a touch-sensitive panel or an operation switch 16 disposed in the vehicle.

The control portion 2 may have a drawing processing unit 18 that may, for example, extracting image data, reading image data, and output image data. The drawing processing unit 18 may include, for example, a calculating unit for performing image processing, a VRAM for temporarily storing output image data to be displayed on the display 6.

The drawing processing unit 18 may, for example, input image data G acquired by the image data acquiring unit 10 for each image acquiring distance D1. The drawing processing unit may extract the images 30 based on the image data G shown in screen (a) in FIG. 5. The drawing processing unit may only extract the predetermined saved region B1 from the image data G and, as shown in screen (b) of FIG. 5, partial data G1 may be generated. The saving region B1 may be of the same width (the length in the y-axis direction) as the image data G in the image coordinate system (x, y), and may be a region in a rectangular shape that is formed so that the height thereof (the length in the x-axis direction) is shorter than the image 30. That is to say, of the image display region Z in the display 6, the region that is on the vehicle C side of region Z is considered to be the saving region B1.

The drawing processing unit 18 may convert the partial data G1 into overhead image data G2, which is recorded image data. For example, the drawing processing unit 18 may read a coordinate conversion table stored in the ROM 5 and may convert the various pixel coordinates of the partial data G1 into pixel coordinates of a conversion target determined by the table. Thus, the partial data G1 may be upward in the vertical direction of the current intersecting point of the optical axis of the camera 25 and the roadway surface, and the view may be converted to a virtual view that is set in approximately the same position as the height position of the camera 25. As a result, the image 31 may be converted to an overhead image 32 looking down from a high position as shown in screen (c) in FIG. 5, based on the partial data G1 as shown in (b) in FIG. 5.

When overhead image data G2 is generated by the drawing processing unit 18, the controller 3 may attach the position at which the image data G (converted to overhead image data G2) was captured, to the overhead image data G2, as image-capturing position data 13. Also, the steering angle (e.g., based on the steering sensor signal ST) may be attached, as steering angle data 14. As a result, the overhead image data G2, to which the image-capturing position data 13 and the steering angle data 14 are attached, may be stored in the image memory 15, as recorded data G3. In other words, various recorded data G3 generated each time the vehicle C shifts by the image acquiring distance D1 may be accumulated in the image memory 15. The attached image-capturing position data 13 may have absolute coordinates or can have relative coordinates, for example, from a predetermined position. Additionally or alternatively, directional data based on the directional detecting signal DS may be attached to the overhead image data G2.

The drawing processing unit 18 may output the map screen 6a (described above) on the display 6 in the event that the vehicle C is moving forward or is stopped. When the vehicle C is moving in reverse, under control of the controller, the above-described first display mode may be output. The drawing processing unit 18 may acquire the image data G, which is image-captured at the current position of the vehicle C, from the image data acquiring unit 10, and may display the rearview monitor screen a captured image of the rear of the vehicle C on the display 6. The screen may be updated according to the movement of the vehicle C.

Figure 12:
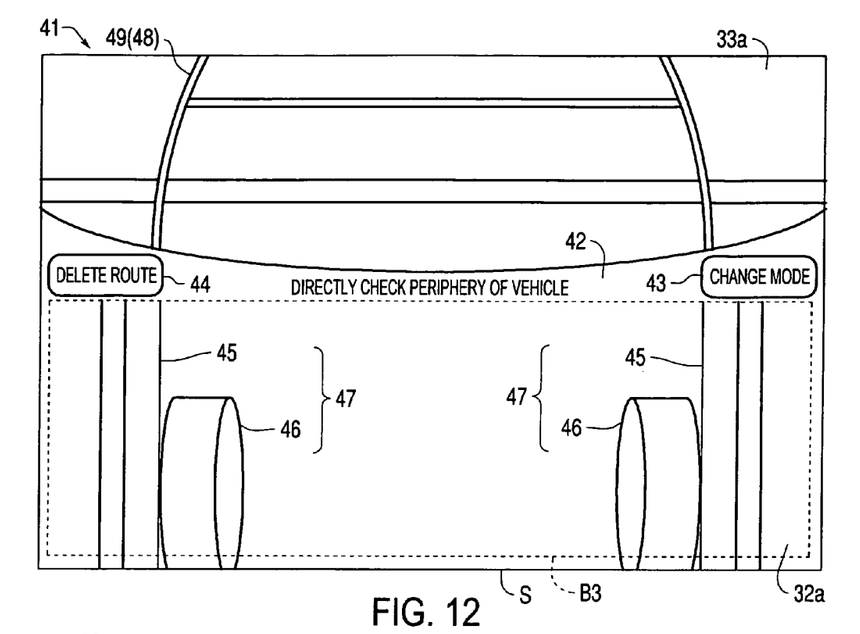
FIG. 12 shows an exemplary parking assist screen.

In the case of the second display mode, under control of the controller, the drawing processing unit 18 may output a parking assistance screen 41 such as that shown in FIG. 12. Specifically, the drawing processing unit 18, as discussed above, may accumulate recorded data G3 in the image memory 15 for each image acquiring distance D1, from an initial image-capturing position A (FIG. 4) to the predetermined distance of shifting the synthesizing distances D3, shown in FIG. 4. According to this example, the synthesizing distance D3 may be set to about 1 m.

Figure 6:
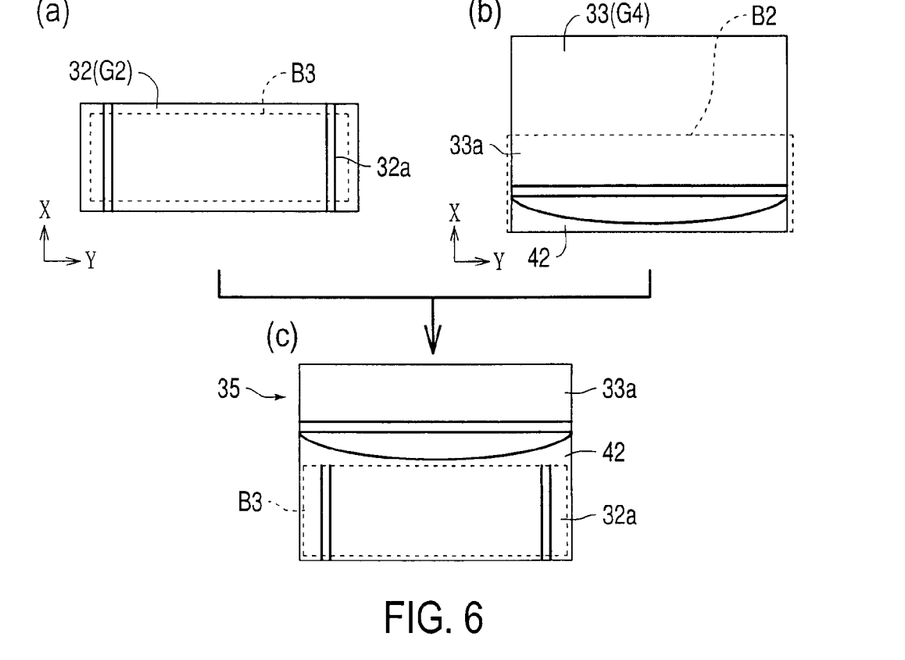
FIG. 6 shows an exemplary method of synthesizing image data.

When the vehicle C moves in reverse from the initial position A by an amount equal to the synthesizing distance D3, and arrives at the position B, the drawing processing unit 18 may acquire image data G that is captured at the current position of the vehicle C (position B) from the image data acquiring unit 10. This image data G will be hereafter referred to as current image data G4. The current image data G4 may include image data of the rear edge image 42 which has captured the rear bumper RB, as in the image 33 shown in screen (b) in FIG. 6. Of the current image data G4, synthesized region B2 becomes the region for synthesizing with the overhead image data G2. Note that the coordinates sectioning the synthesized region B2 may be fixed.

The drawing processing unit 18, under control of the controller 3, may search the recorded data G3, which is correlated to the position in the rear direction of the synthesizing distance D3 from the current position of the vehicle C, within the image memory 15. When the applicable recorded data G3 is read, the synthesized region B3 may be determined according to the steering angle at that point, of the overhead image data G2 within the recorded data G3. In other words, in the case that the vehicle C is moving straight in reverse (in the X-axis direction), the drawing processing unit 18 extracts the image data in the synthesized region B3 shown in screen (c) in FIG. 5, of the overhead image data G2. The synthesized region B3 in the case of straight movement is in a rectangular shape, and a margin B4 may be secured on the upper and lower portions and on both sides of the overhead image data G2.

The drawing processing unit 18, under control of the controller 3, may output the synthesized region B2 of the current image data G4 and the synthesized region B3 of the overhead image data G2 together in the vertical direction (in the x-axis direction in the screen coordinate system). That is to say, a past image 32a based on the overhead image data G2 shown in screen (a) in FIG. 6 may be synthesized so as to be continuous with the current image 33a of the current image data G4, and the synthesized image 35 shown in screen (c) in FIG. 6 may be output on the display 6.

In the case that the vehicle C is moving in reverse while turning, under control of the controller 3, the drawing processing unit 18 may set the synthesized region B3, for example, using the margins B4, according to the relative angle of the steering angle at that time and the past steering angle based on the steering angle data 14 attached to the overhead image data G2, and may extracts the image data according to the steering angle. The image data thus extracted may be synthesized with the synthesized region B2 of the current image data G4, and so the continuity of the image based on the overhead image data G2 and the image based on the current image data G4 may be improved.

The drawing processing unit 18, under control of the controller 3, may draw the above-described projection line 47 so as to overlap with the past image 32a of the synthesized image 35. Thus, the parking assist screen 41 shown in FIG. 12 may be output on the display 6. The past image 32a may be displayed in the opposite direction (bottom) of the movement direction (the x-axis direction in the screen coordinate system), and the current image 33a may be displayed in the movement direction (upper portion) of the parking assist screen 41. The past image 32a may be an image of the region equivalent to below the floor of the vehicle C when at the current position (position B). In other words, the saving region B1 may be set to a region wherein the blind spot of the camera 25 (below the floor and the surrounding area thereof) is captured when at a position shifted the synthesizing distances D3 from the image-capturing position of the overhead image data G2. Accordingly, by displaying the projection line 47 showing the outline of the vehicle C on the past image 32a, the position of the vehicle C in the past image 32a may be shown.

On the lower edge of the current image 33a, a rear edge image 42 showing the position of the rear bumper RB may be displayed. Therefore, the relative distance between the rear edge of the vehicle C and obstacles, white lines indicating parking spaces, and/or wheel stops may be determined. Under control of the controller 3, the drawing processing unit

18 may draw a vehicle width extension line 48, which is an extension of the vehicle width, and/or an estimated course line 49 showing a movement pathway based on the current steering angle. Note that in FIG. 12 an example is shown wherein the vehicle C moves straight backwards. Therefore the vehicle width extension line 48 overlaps with the estimated course line 49.

An operation unit 43 for switching from the second display mode to the first display mode and/or an operation unit 44 for instructing deletion of the estimated course line 49 may be displayed on the parking assist screen 41.

Figure 9:
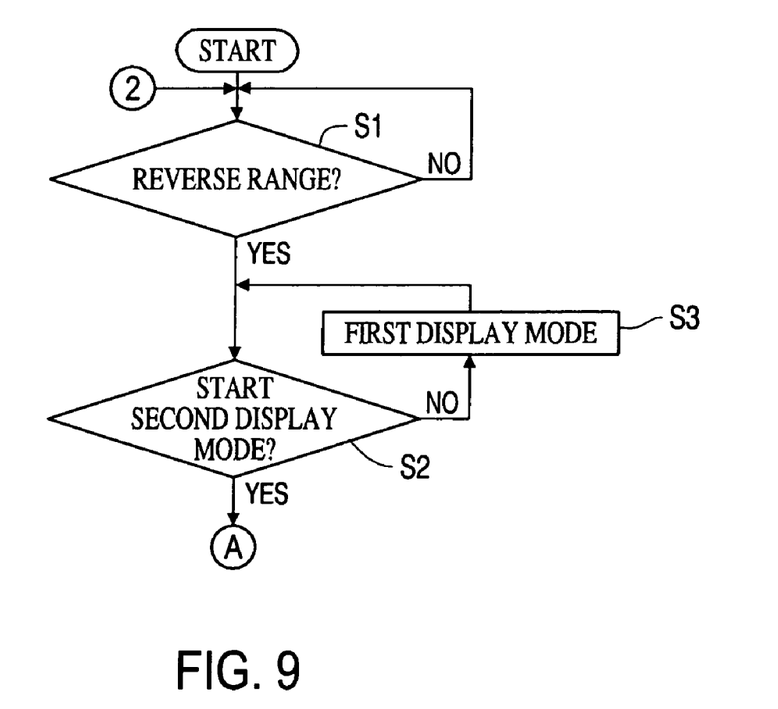
FIG. 9 shows an exemplary parking assist method.
Figure 10:
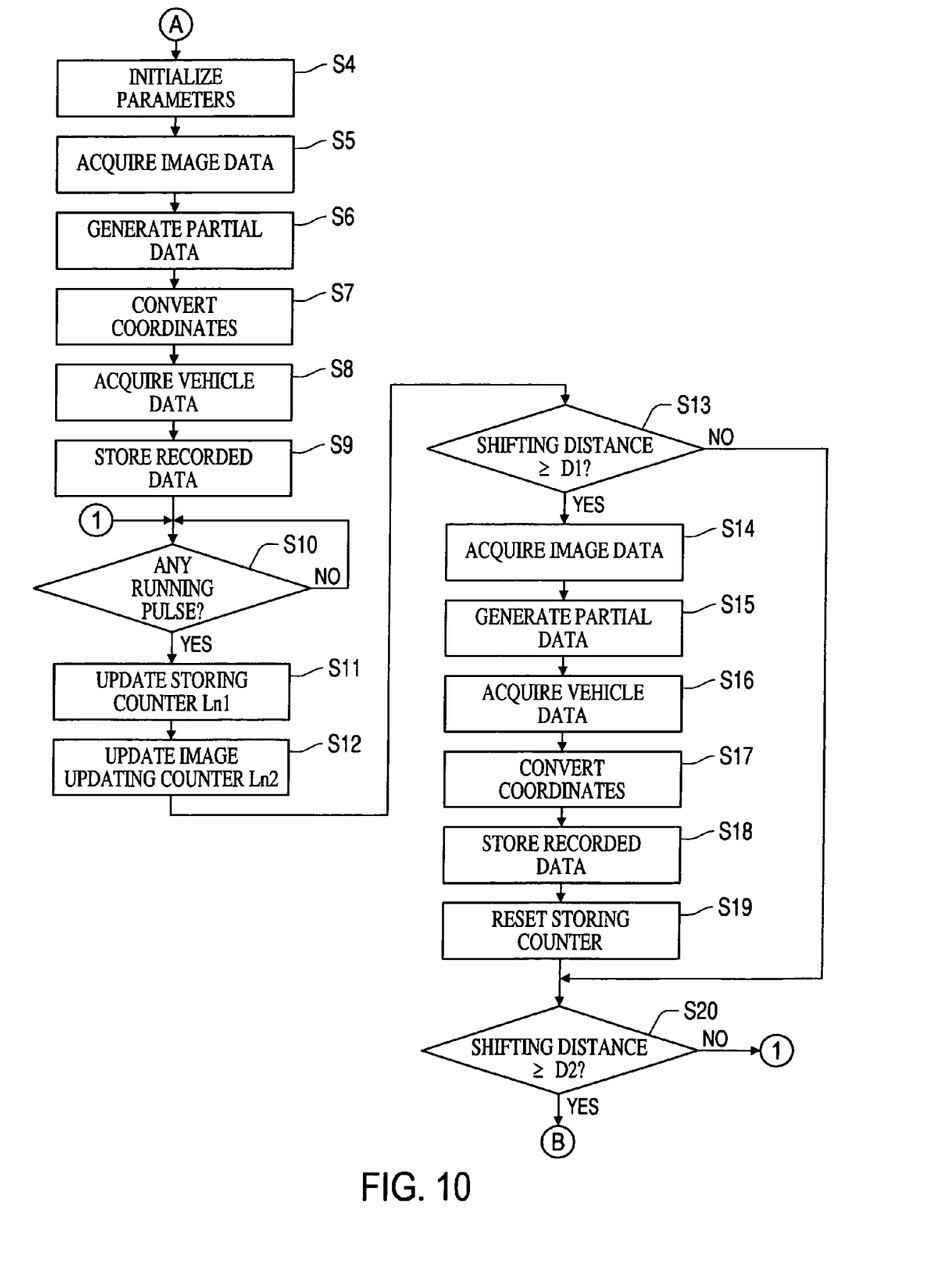
FIG. 10 shows an exemplary parking assist method.
Figure 11:
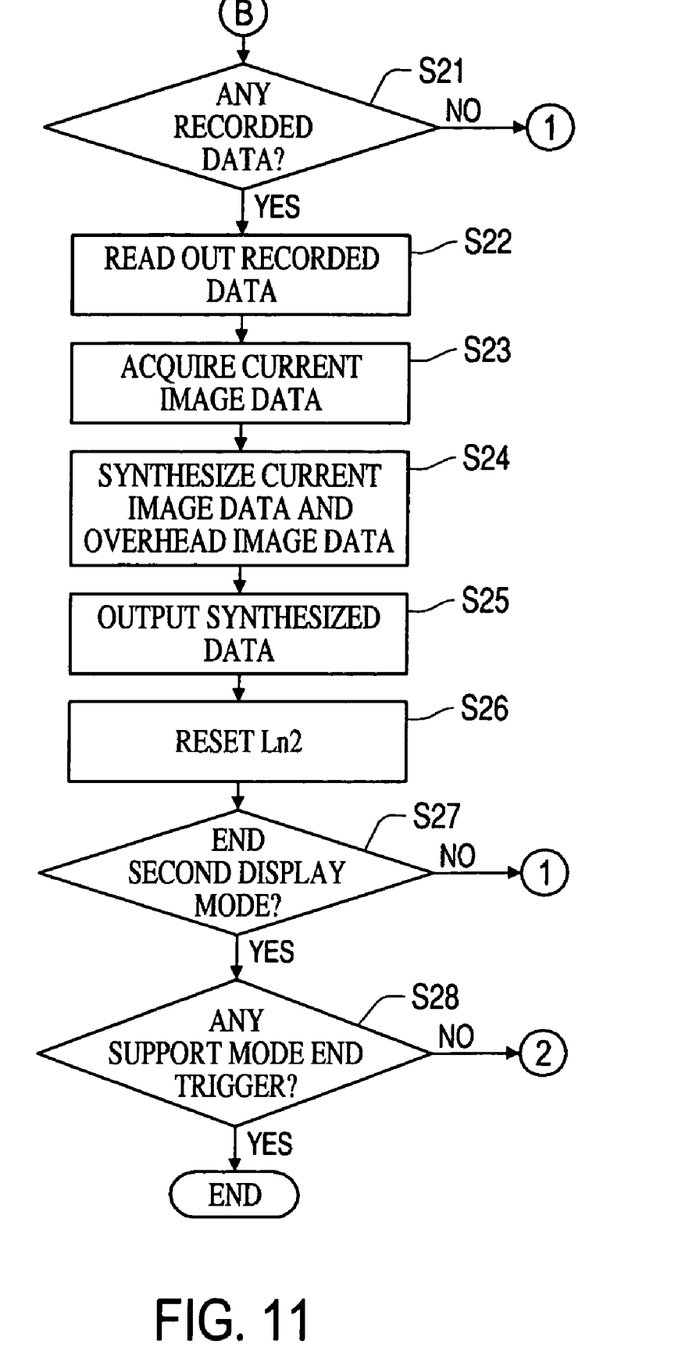
FIG. 11 shows an exemplary parking assist method.

FIGS. 9-11 show an exemplary parking assist method. The exemplary method may be implemented, for example, by one or more components of the above-described navigation device 1 or a stand-alone parking assist device. However, even though the exemplary structure of the above-described navigation device 1 may be referenced in the description, it should be appreciated that the structure is exemplary and the exemplary method need not be limited by any of the above-described exemplary structure.

First, as shown in FIG. 9, the controller 3 of the navigation device 1 may repeatedly determine whether the gear shift of the vehicle C is in reverse, for example, based on the shift position signal SP input from the shift position switch 20. This step may be performed, for example, according to a parking assist program stored on the ROM 5, after initializing the navigation device 1 (step S1). If the gearshift is in reverse (YES in step S1), determination is made as to whether the current mode of the navigation device 1 is in the second display mode, which displays the parking assist screen 41 (step S2). This second display mode can be selected, for example, by an operating unit 43 displayed on the display 6 or by an operating switch 16 disposed in the vehicle. If the second display mode is selected, a mode start flag stored in the main memory 4 may be set to the on state. When the mode start flag stored in the main memory 4 is determined to be in the off state (NO in step S2) by the controller 3, the controller 3 may control the drawing processing unit 18 to display the first display mode (step S3). If the mode start flag is determined to be in the on state (YES in step S2), the process advances to step S4.

As shown in FIG. 10, in step S4, the controller 3 may initialize parameters storage counter Ln1 and image updating counter Ln2. The storage counter Ln1 may be a counter for determining whether the image acquiring distance D1 (at which the image data G is acquired) has been reached, and counts the number of input pulses from the speed sensor 22. The image updating counter Ln2 may be a counter for determining whether the image updating distance D2 (which updates the parking assist screen 41) has been reached, and counts the number of input pulses also from the speed sensor 22. According to this example, the image updating distance D2 may be set to about 200 mm and may be the same distance as the image acquiring distance D1.

When initialization of the parameters is performed, the controller 3 may acquire the image data G from the camera 25 via the image data acquiring unit 10 (step S5). The drawing processing unit 18 extracts the saving region B1 shown in (a) in FIG. 5 from the image data G and may generates the partial data G1 (e.g., image 31 in screen (b) in FIG. 5) (step S6).

The drawing processing unit 18 may then convert the coordinates of the generated partial data G1 into the overhead image data G2 (step S7). Also, for example, at almost the same time, the controller 3 may acquire vehicle data such as the shift position signal SP, steering sensor signal ST, speed signal VS, directional detecting signal DS, via a vehicle side interface unit 8 (step S8). Based on one or more of the GPS receiving unit 7, the speed signal VS, and the directional detecting signal DS, the vehicle position may be calculated.

Under control of the controller, the drawing processing unit 18 may attach the image-capturing position data 13 and the steering angle data 14 to the overhead image data G2 and may store the data in the image memory 15 as recorded data G3 (step S9). Thus, the overhead image data G2 image-captured in the initial position A may be correlated to the image-capturing position data 13 and steering angle data 14 at the initial position A, and is stored.

When the stored data G3 of the initial position A is stored, the controller 3 may make a determination as to whether or not a pulse is input showing the reverse movement of the vehicle C, based on the speed signal VS (step S10). In the case that a reverse pulse is input (YES in step S10), the number of input pulses such as "1" may be added to the storage counter Ln1 (step S11). Also, "1" may be added to the image updating counter Ln2, and the image updating counter Ln2 may be updated (step S12).

Then the controller 3 may calculate the shifting distance from the count start position (here, the initial position A), based on the storage counter Ln1, and may determine whether the distance the vehicle has shifted in the rearward direction is greater than the image acquiring distance D1 (about 100 mm) (step S13). When the vehicle C is at a distance greater than about 100 mm from the initial position A, the controller 3 may determine that the image acquiring distance D1 has been reached (YES in S13), and as in step S5, the image data G may be acquired via the image data acquiring unit 10 (step S14). Also, as in step S6, the saving region B1 may be extracted from the acquired image data G, and the partial data G1 may be generated (S15).

Further, the drawing processing unit 18 may acquire the vehicle data via the controller 3 (step S16) in the same way as in step S8, and may converts the partial data G1 to the coordinates of the overhead image data G2 (S17). The drawing processing unit 18 may store the overhead image data G2 in the image memory 15 as recorded data G3 (step S18).

Next, the controller 3 may reset the storage counter Ln1 to the initial value thereof (step S19). In other words, in steps S13 through S19, the saving region B1 is extracted and the partial data G1 is generated, and further, after the coordinates are converted, the data G1 may be accumulated in the image memory 15 along with the image-capturing position data 13 and the steering angle data 14 of the vehicle C. At this time, the region below the floor of the vehicle C (the blind spot region of the camera 25) and the region in the present area are saved. Importantly regions unnecessary for synthesizing (i.e., regions other than G1) are not saved, and so the data amount of the storing data G3 can be reduced. Also, the coordinates of the extracted partial data G1 may be converted without converting the coordinates of the entire image data G, and so the conversion processing can be reduced, and processing time can be shortened.

In step S20, the controller 3 may determine whether the shifting distance corresponding to the image updating counter Ln2 is greater than the image updating distance D2 (about 100 mm). For example, when the vehicle C is in a position reversed only the image updating distance D2 from the initial position A, a determination may be made that the shifting distance based on the image updating counter Ln2 is greater than the image updating distance D2 (YES in step S20), and the process advances to step S21. Note that in the case that the image updating counter Ln2 does not satisfy the image updating distance D2 (NO in step S20), the process returns to step S10.

As shown in FIG. 11, in step S21, the drawing processing unit 18 may search within the image memory 15, and determines whether the recorded data G3 (captured in the position to the rear of the synthesizing distance D3 from the current position of the vehicle C) is stored in the image memory 15. Specifically, the controller 3 may compute the vehicle course based on the image-capturing position data 13 within the recorded data G3, and searches the recorded data G3 in the movement direction. For example, in the case that the vehicle C is in a position between the position B shown in FIG. 4 from the initial position A, determination is made that the recorded data G3 which is captured in the position to the rear only the synthesizing distance D3 (about 1 m) from the current position has not be stored (NO in step S21), and the process returns to step S10.

Figure 4:
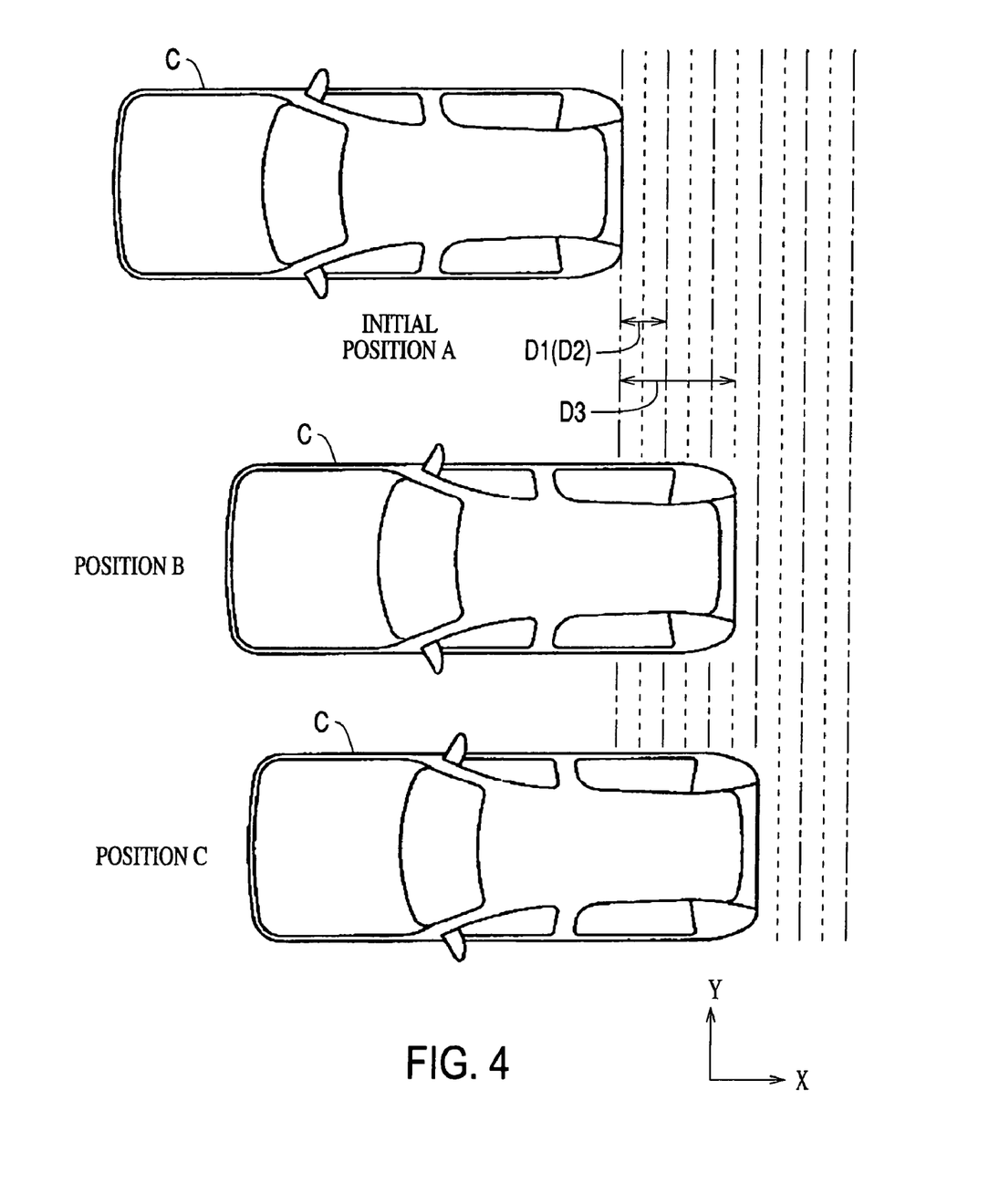
FIG. 4 shows an exemplary timing of image acquiring and image updating.

Then, steps S10 through S20 are repeated, and in the case that the controller 3 determines the vehicle position is in the position B shown in FIG. 4, for example, a determination may be made that there is the appropriate recorded data G3 (YES in step S21), and the recorded data G3 thereof is read (step S22).

Further, the drawing processing unit 18 may acquire the current image data G4, via the image data acquiring unit 10 (step S23), and may create synthesized data wherein the synthesized region B3 of the current image data G4 and the synthesized region B2 of the overhead image data G2 are displayed together vertically (step S24). At this time, as described above, in the case that the vehicle C advances from the initial position A to the position B, the data of the synthesized region B3 of the rectangular shape shown in screen (c) in FIG. 5 may be extracted. Also, in the case that the past steering angle based on the steering angle data 14 within the read out recorded data G3 and the current steering angle differ, the synthesized region B3 of the overhead image data G2 may be changed to match the corresponding angle according to the corresponding angle.

The drawing processing unit 18 may output the synthesized data thereof to the image display region 6a of the display 6 (step S25). As a result, a synthesized image 35 may be displayed which is shown in screen (c) in FIG. 6, based on the overhead image data G2 shown in screen (a) in FIG. 6 and the current image data G4 shown in screen (b) in FIG. 6.

Further, the drawing processing unit 18 may draws the projection line 47 on the synthesized image 35. The drawing processing unit 18 may also draw the operating unit 43, the vehicle width extension line 48, and/or the estimated course line 49, and may display the parking assist screen 41 shown in FIG. 12 in the display 6.

When the parking assist screen 41 is output in the display 6, the controller 3 may reset the image updating counter Ln2 (step S26). Then it may be determined whether the second display mode is in the off state (step S27). Specifically, it may be determined whether an input is received by the touch-sensitive panel operation or the operation switch 16 for ending the second display mode in the user input interface unit 17.

In the case that the second display mode is in the off state (YES in step S27), a determination is made as to whether a trigger is input for ending the parking support mode (step S28). This ending trigger may be, for example, a signal indicating that the ignition is turned off and/or a signal showing change to the shift position, which are output from an electronic control device (ECU) provided in the vehicle C.

In the case that the second display mode is in the on state (NO in step S27), the process returns to step S10, and steps S10 through S13 are repeated. Then, for example, when the vehicle C has reversed by only the image updating distance D2 (the image acquiring distance D1) from the position B shown in FIG. 4, and is positioned in position C, the controller 3 may determine that the distance corresponding to the storage counter Ln1 is greater than the image acquiring distance D1 (YES in step S13). Then at the position C, the image data G may be acquired which displays the image 36 such as that shown in FIG. 5 (step S14). The drawing processing unit 18 may extract the saving region B1 from the image data G, and generates the partial data G1 such as image 37 in screen (e) in FIG. 5 (step S15). Further, the drawing processing unit 18 may convert the coordinates of the generated partial data G1 and may generate overhead image data G2 such as the overhead image 38 in screen (f) in FIG. 5 (step S17). Then the image-capturing position data 13 and the steering angle data 14 may be attached to the overhead image data G2 and may be stored in the image memory 15 as recorded data G3 (step S18).

Figure 7:
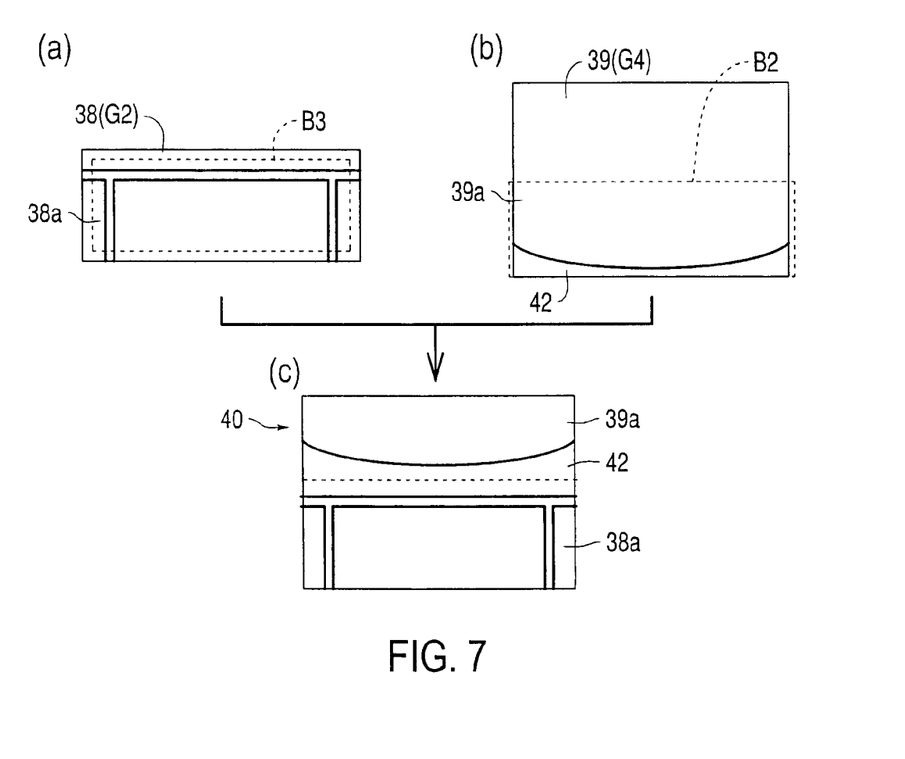
FIG. 7 shows an exemplary method of synthesizing image data.

After the storage counter Ln1 has been reset by the controller 3 (step S19), the drawing processing unit 18 may search the image memory 15 and may read out the recorded data G3, which has been image-captured to the rear from the initial position A only the synthesizing distance D3 (step S22). Further, the current image data G4 that is image-captured at the position C is acquired (step S23). Next, the synthesized region B2 of the current image data G4 and the synthesized region B3 of the overhead image data G2 within the recorded data G3 are synthesized (step S24). In other words, after the synthesized region B3 of the overhead image 38 shown in screen (a) in FIG. 7 and the synthesized region B2 of the current image 39 based on the current image data G4, shown in screen (b) in FIG. 7 have been synthesized, a synthesized image 40 is output to the display 6, as shown in screen (c) (step S25).

Thus, each time the vehicle C shifts its position in the rearward direction an amount equal to the image acquiring distance D1, recorded data G3 may be generated, and each time the vehicle C is shifted in the rearward direction an amount equal to the image updating distance D2, the parking assist screen 41 may be updated. When a parking operating has been completed, and an ending trigger has been input (YES in step S28), the controller 3 may end the parking support mode.

According to the above examples, the drawing processing unit 18 of the navigation device 1 may acquire image data G from the image data acquiring unit 10, each time the vehicle C shifts a distance equal to the image acquiring distance D1 in the rearward direction. Only the saving region B1 for use to display the synthesized images 35 and 40 is extracted from the image data G. The extracted partial data G1 is correlated with the image-capturing position data 13 showing the image-capturing position and the steering angle data 14, and is stored in the image memory 15 as overhead image data G2. When outputting the parking assist screen 41, the overhead image data G2 which is image-captured at the image-capturing position to the rear at the synthesizing distance D3 in the movement direction from the current position is read out, based on the image-capturing position data 13, and the synthesized region B3 of the read out overhead image data G2 and the synthesized region B2 of the current image data G4, are displayed together and output on the display 6. Accordingly, the drawing processing unit 18 need only save the portions of the acquired image data G (e.g., partial data G1) which are necessary for synthesizing. Therefore the data amount in the recorded data G3 can be decreased. Thus, the required capacity of the image memory 15 can be smaller. Further, by the data amount of the recorded data G3 being smaller, searching of the recorded data G3, image processing (such as readout processing or coordinate conversion), and/or output processing can be reduced, and the processing time can be shortened. Accordingly, the frequency for image updating can be increased.

According to the above examples, if the vehicle C is the synthesizing distance D3 from the image-capturing position of the overhead image data G2, the saving region B1 of the overhead image data G2 is the region of the roadway and background which are the blind spots of the camera 25 that have been image-captured. Thus, in the event that the vehicle C advances only the synthesizing distance D3 from the image-capturing position of the overhead image data G2, the overhead image data G2 may be read, and the image below the floor can be displayed on the parking assist screen 41. Accordingly, by visually confirming the parking assist screen 41, the relative distance between the vehicle C and the parking target region and/or the relative distance between the rear wheel CR and a wheel stop can be understood.

According to the above examples, after the drawing processing unit 18 extracts the saving region B1 from the image data G, coordinates are converted and the overhead image data G2 is generated. Thus, converting the coordinates of the entire image data G is not necessary and coordinate conversion processing can be reduced. Also, that continuity of the current images 33a and 39a can be improved based on the current image data G4.

According to the above examples, the steering angle data 14 may be attached to the overhead image data G2 and may be stored in the image memory 15. Also, the drawing processing unit 18 may change the synthesized region B3 of the overhead image data G2, based on the relative angle of the past steering angle based on the steering angle data 14 of the read out recorded data G3, and the current steering angle. Thus, in the event of displaying the past images 32a and 38a together with the current images 33a and 39a, continuity of the images can be improved.

According to the above examples, the drawing processing unit 18 may draw a projection line 47 showing the current position of the vehicle C on the past images 32a and 38a. Thus, the position of the vehicle C on the past images 32a and 38a can be understood, and the movement of the vehicle relative to the parking target region can be understood.

According to the above examples, the parking assist device may be incorporated in a navigation device 1 comprising a GPS receiving unit 7, a display 6, and a vehicle side interface unit 8. Therefore, the various devices that a navigation device 1 generally can provide accurate image-captured position data 13 that can be attached to the overhead image data G2. Accordingly, the drawing processing unit 18 may read out accurate overhead image data G2 at each location, and outputs the synthesized images 35 and 40.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles. Some examples follow.

Figure 13:
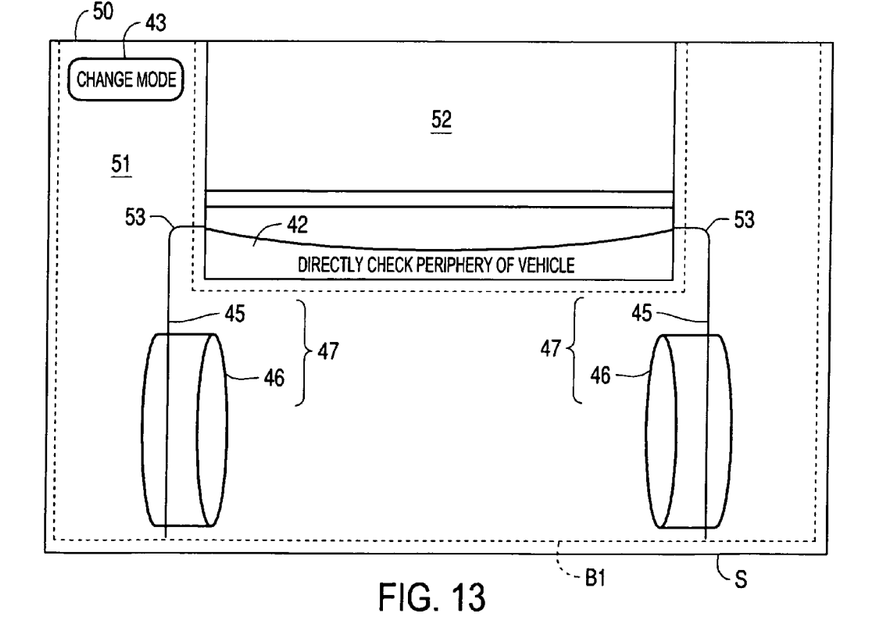
FIG. 13 shows an exemplary parking assist screen.

The saving region B1 need not be restricted to a rectangular shape. Rather, other shapes may be employed as well, such as the saving region B1 being formed as a region having the shape of a box open at the top (in a U-shape) of the image display region on the display 6, as shown in FIG. 13. The saving region B1 may be a region displaying the blind spot region, which currently is below the floor of the vehicle C and the corner portions including the corner areas of the rear bumper. The drawing processing unit 18 may dispose the current image 52 on the upper portion of the image display region, and the parking assist screen 50 displaying the past image 51 on both sides and on the lower portion of the current image 52 may be output to the display 6. The current image 52 may be an image wherein the current image data G4 is compacted, and further can have overhead conversion performed. Thus, the corner portions BC, which are not included in the image of the camera 25, may also be displayed. Also, the rear edge image 42 of the current image 52 may be made continuous to the position of the corner portions BC, and the outline 53 showing the corner portions BC may be drawn. By doing so, the relative positions of the corner portions BC with respect to obstacles can be understood.

The above examples have been described with the virtual point of view being vertically above the intersecting point of the optical axis and the roadway surface and set in approximately the same position as the height position of the camera 25. However, the virtual point of view need not be restricted to this arrangement, and another height may be set.

According to the above examples, the determination as to whether the amount the vehicle shifts in a rearward direction is calculated based on the number of pulses input from the speed sensor 22, and whether the shifting amount is more than the image acquiring distance D2. Alternatively, the leading edge of the input pulse may be a trigger and the trailing edge of the same pulse signal may be another trigger.

According to the above examples, the position of the navigation device 1 being is the vehicle position. However, the position of the navigation device 1 may be in the position of the camera 25, the position of the rear bumper RB of the vehicle C, or in other positions.

The image acquiring distance D1 and the image updating distance D2 may be different distances and/or may be set differently than about 100 mm. Further, the synthesizing distance D3 may be different than about 1 m.

Moreover, a gyro sensor may be included in the navigation device 1 to detect the direction of the vehicle C.

The synthesized region B3 of the overhead image data G2 need not be changed in the event of the vehicle C moving in reverse while turning.

Also, while the above examples have been described with the overhead image data G2 being generated from the partial data G1, the partial data G1 may be stored as recorded data G3. Also, for displaying past images, the view may be converted to the current view of the camera 25.

As an alternative, the camera 25 may be affixed to the front of the vehicle C instead of on the rear, with parking assist processing being performed when the vehicle C advances forward into the parking target region. In this case, the saving region B1 may be set as an area below the floor on the front of the vehicle and/or the corners of the front bumper.

Also, the current image data G4 and the overhead image data G2 can be displayed on the display 6 in the case of performing parallel parking as well.

If the parking assist device is another onboard device, the GPS receiving unit 7, the map data storage unit 9, and/or the like, may be omitted as appropriate.

What is claimed is:

1. A parking assist method for a vehicle, comprising:
  determining a current position of the vehicle;
  acquiring image data from a camera provided on the vehicle;
  extracting a predetermined region of the acquired image data, the predetermined region being a portion of the image that will be in a blind spot of the camera if the vehicle travels a first predetermined distance from the current position;
correlating the extracted image data with the current position of the vehicle;
causing the correlated extracted image data to be stored in a memory;
reading out past correlated extracted image data, the past correlated extracted image data having been acquired when the vehicle was in a previous position, the previous position being a second predetermined distance from the current position; and
outputting a parking assist image to a display, the parking assist image displaying both the past correlated extracted image data, and the image data acquired at the current position of the vehicle.

2. The parking assist method of claim 1, further comprising determining whether the vehicle is in reverse.

3. The parking assist method of claim 2, wherein determining whether the vehicle is in reverse comprises determining a position of a gear selector of the vehicle.

4. The parking assist method of claim 1, further comprising drawing an indicator showing the current position of the vehicle on the past correlated extracted image data.

5. The parking assist method of claim 1, wherein the blind spot of the camera comprises:
at least one of an area beneath a floor of the vehicle; and
an area around a corner portion of a bumper of the vehicle.

6. The parking assist method of claim 1, further comprising converting the past correlated extracted image data to an overhead view of the past correlated extracted image data before the past correlated extracted image data is output on the display.

7. The parking assist method of claim 1, further comprising:
correlating the extracted image data with at least one of:
a steering angle of the vehicle; and
a direction of the vehicle; and
calculating a relative steering angle based on a current steering angle of the vehicle and the at least one of the steering angle and the direction of the vehicle;
wherein outputting the parking assist image comprises outputting the past correlated extracted image data based on the calculated relative steering angle.

8. The parking assist method of claim 1, further comprising:
determining whether the vehicle has traveled the first predetermined distance or the second predetermined distance based on a pulse signal output from a speed sensor of the vehicle.

9. The parking assist method of claim 1, wherein the first predetermined distance and the second predetermined distance are equal.

10. A storage medium storing a set of program instructions executable on a data processing device, the instructions usable to implement the method of claim 1.

11. A parking assist device for a vehicle, comprising:
a controller that:
determines a current position of the vehicle;
acquires image data from a camera provided on the vehicle;
extracts a predetermined region of the acquired image data, the predetermined region being a portion of the image that will be in a blind spot of the camera if the vehicle travels a first predetermined distance from the current position;
correlates the extracted image data with the current position of the vehicle;
causes the correlated extracted image data to be stored in a memory;
reads out past correlated extracted image data, the past correlated extracted image data having been acquired when the vehicle was in a previous position, the previous position being a second predetermined distance from the current position; and
outputs a parking assist image to a display, the parking assist image displaying both the past correlated extracted image data, and the image data acquired at the current position of the vehicle.

12. The parking assist device of claim 11, further comprising:
the memory; and
the display.

13. The parking assist device of claim 11, wherein the controller draws an indicator showing the current position of the vehicle on the past correlated extracted image data.

14. The parking assist device of claim 11, wherein the blind spot of the camera comprises:
at least one of an area beneath a floor of the vehicle; and
an area around a corner portion of a bumper of the vehicle.

15. The parking assist device of claim 11, wherein the controller converts the past correlated extracted image data to an overhead view of the past correlated extracted image data before the past correlated extracted image data is output on the display.

16. The parking assist device of claim 11, wherein the controller:
correlates the extracted image data with at least one of:
a steering angle of the vehicle; and
a direction of the vehicle;
calculates a relative steering angle based on a current steering angle of the vehicle and the at least one of the steering angle and the direction of the vehicle; and
outputs the past correlated extracted image data based on the calculated relative steering angle.

17. The parking assist device of claim 11, wherein the controller:
determines whether the vehicle has traveled the first predetermined distance or the second predetermined distance based on a pulse signal output from a speed sensor of the vehicle.

18. The parking assist device of claim 11, wherein the first predetermined distance and the second predetermined distance are equal.

19. A navigation system comprising the parking assist device of claim 1.

20. A parking assist device for a vehicle, comprising:
means for determining a current position of the vehicle;
means for acquiring image data from a camera provided on the vehicle;
means for extracting a predetermined region of the acquired image data, the predetermined region being a portion of the image that will be in a blind spot of the camera if the vehicle travels a first predetermined distance from the current position;
means for correlating the extracted image data with the current position of the vehicle;
means for causing the correlated extracted image data to be stored in a memory;
means for reading out past correlated extracted image data, the past correlated extracted image data having been acquired when the vehicle was in a previous position, the previous position being a second predetermined distance from the current position; and means for outputting a parking assist image to a display, the parking assist image displaying both the past correlated extracted image data, and the image data acquired at the current position of the vehicle.

* * * * *